UNITED STATES PATENT OFFICE.

BRUNO RICHARD SEIFERT, OF RADEBEUL, GERMANY, ASSIGNOR TO DR. F. VON HEYDEN NACHFOLGER, OF SAME PLACE.

CITRICPHENETIDIN ACID AND PROCESS OF OBTAINING IT.

SPECIFICATION forming part of Letters Patent No. 555,711, dated March 3, 1896.

Application filed February 28, 1895. Serial No. 540,070. (Specimens.)

*To all whom it may concern:*

Be it known that I, BRUNO RICHARD SEIFERT, chemist, of Radebeul, near Dresden, in the Kingdom of Saxony, in the Empire of Germany, have invented a new Class of Chemical Compounds, which I term "Citricphenetidin Acids," and a Process for the Production of the Same, of which the following is a specification.

I have discovered that on heating para-amido-phenetol with citric acid new chemical compounds are formed according to the following equations:

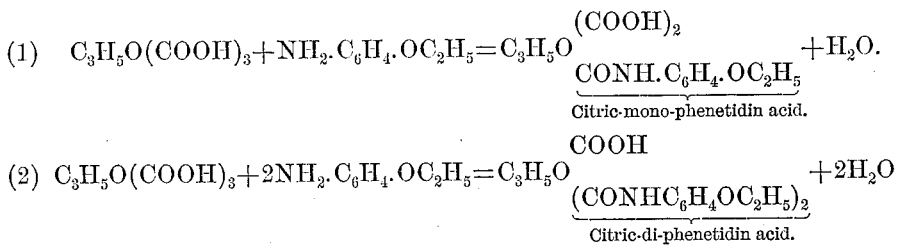

The citric-mono-phenetidin acid forms a white crystalline powder or large transparent crystals. It is readily soluble in cold water and still more readily in hot water. It tastes and reacts acid and dissolves in soda solution with effervescence. It melts at 72° centigrade. In titrating one molecule of the acid will require two molecules of NaOH. In drying under warm condition it loses one molecule of water, whereby the melting-point is raised to 129° centigrade. Out of hot water the substance will again crystallize with the melting-point 129° centigrade. In heating the same, however, with soda solution the thus-formed sodium salt will again take up one molecule of water and by acidulating citricphenetidin acid is again obtained of the melting-point 72° centigrade. This compound, as well as the one poorer in water, will readily precipitate from a concentrated solution in an oil-like condition.

Citric-di-phenetidin acid is a white powder, difficultly dissolving in water, more readily in alcohol and soda-lye, especially while heating. The sodium salt is soluble in water, but nearly insoluble in alcoholic liquids. The citric-di-phenetidin acid melts at 178° centigrade. It dissolves in soda solution only at a heat corresponding to the more difficult solubility of its soda salt. If the soda salt is filtered off and afterward dissolved in water and acidulated with muriatic acid, the di-acid will preciptate in an unchanged condition. If heated with a ten-per-cent. soda-lye for a period of half an hour at the reflux-cooler, the di-acid will show after acidulation the unchanged melting-point 178° centigrade.

The citric-mono-phenetidin acid and citric-di-phenetidin acid and their salts are medicinal substances, distinguishable by their action as antipyretics and analgetics by the absence of injurious secondary reactions and by the rapidity with which they act. They may be administered in doses of a quarter gram to ten grams.

Such new substances are produced by heating para-amido-phenetol with citric acid or derivatives of citric acid—for instance, chlorid of citric acid or ether of citric acid. The product of this reaction is treated with hot water or with a solution of soda or of caustic soda and then with hydrochloric acid. Finally it is crystallized out from the water or other solvent.

What I claim as my invention is—

1. The new citricphenetidin acids herein described possessing the distinguishing qualities hereinabove specified, viz: having the form of white crystalline powder, of acid reaction, soluble in water in alcohol and in soda solutions, forming sodium salts with soda-lye and being decomposed by heating with hydrochloric acid under pressure into citric acid and chlorid of phenetidin.

2. The within-described process of obtaining citricphenetidin acids consisting in first heating para-amido-phenetol with citric acid or its derivatives, next treating the product of this reaction with hot water or with solutions of soda or caustic soda and of a mineral acid successively and finally crystallizing the salt out from the water or other solvent.

In testimony that I claim the foregoing as my invention I have signed my name in presence of two subscribing witnesses.

BRUNO RICHARD SEIFERT.

Witnesses:
WILHELM WILTENHÜTTER,
HERNANDO DE SOTO.